(12) United States Patent
Edwards, II et al.

(10) Patent No.: US 7,017,944 B2
(45) Date of Patent: Mar. 28, 2006

(54) MULTIPLE CHAMBER INFLATOR

(75) Inventors: Paul C. Edwards, II, Marysville, OH (US); Graylon K. Williams, Warren, MI (US); Donald B. Patterson, Rochester, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/036,550

(22) Filed: Jan. 14, 2005

(65) Prior Publication Data

US 2005/0156420 A1    Jul. 21, 2005

Related U.S. Application Data

(60) Provisional application No. 60/537,152, filed on Jan. 16, 2004.

(51) Int. Cl.
*B60R 21/26* (2006.01)
(52) U.S. Cl. ............... 280/737; 280/736; 280/742; 137/72
(58) Field of Classification Search ............... 280/736, 280/737, 741, 742; 102/530; 137/72, 74
See application file for complete search history.

(56) References Cited

U.S. PATENT DOCUMENTS

| | | | | |
|---|---|---|---|---|
| 4,007,685 | A * | 2/1977 | Nimylowycz | 102/530 |
| 6,454,299 | B1 * | 9/2002 | Whang et al. | 280/736 |
| 6,626,461 | B1 * | 9/2003 | Koga et al. | 280/736 |
| 6,659,500 | B1 * | 12/2003 | Whang et al. | 280/741 |
| 6,752,421 | B1 * | 6/2004 | Khandhadia et al. | 280/741 |
| 6,764,096 | B1 * | 7/2004 | Quioc | 280/736 |
| 6,851,373 | B1 * | 2/2005 | Quioc | 102/530 |
| 2002/0101068 | A1 * | 8/2002 | Quioc | 280/741 |
| 2003/0030259 | A1 * | 2/2003 | Saso et al. | 280/741 |
| 2003/0234526 | A1 * | 12/2003 | Quioc | 280/736 |

* cited by examiner

*Primary Examiner*—Paul N. Dickson
*Assistant Examiner*—George D. Spisich
(74) *Attorney, Agent, or Firm*—L.C. Begin & Associates, PLLC

(57) ABSTRACT

A multiple-chamber inflator (10) for a vehicle occupant protection system. The inflator (10) includes a housing (12) having a first end and a second end, and a divider disc (18) positioned in an interior of the housing (12) intermediate the housing ends to form a first (primary) propellant chamber (20) and a second (secondary) propellant chamber (22) within the interior of the housing (12). The divider (18) has a first surface (59) in communication with the first propellant chamber (20), a second surface (57) in communication with the second propellant chamber (22), and at least one aperture (60) extending between the first and second surfaces to provide fluid communication between the first propellant chamber (20) and the second propellant chamber (22). A pressure-resistant shim (62) fabricated from a low-melting point material is fixed on the divider first surface (59) over the at least one aperture (60) to block the aperture. The shim (62) is configured to melt upon exposure to a predetermined temperature generated by combustion of the propellant (48) in the first propellant chamber (20), thereby opening the at least one aperture (60). The shim (62) isolates the first chamber (20) from the second chamber (22). The shim (62) also facilitates an increase in pressure in the first chamber (20) during combustion of the first gas generating propellant (48), thereby increasing the efficiency of the combustion reaction in the first chamber (20).

4 Claims, 2 Drawing Sheets

MULTIPLE CHAMBER INFLATOR

CROSS REFERENCE TO RELATED APPLICATIONS

This application claims the benefit of provisional application Ser. No. 60/537,152 filed on Jan. 16, 2004.

BACKGROUND OF THE INVENTION

The present invention relates to gas generators used to inflate air bags in a vehicle occupant protection system and, more particularly, to an improved multiple-chamber gas generator containing an improved structure for isolating the propellant chambers of a multiple-chamber inflator so as to ensure proper deployment of the airbag.

Inflation systems for deploying an air bag in a motor vehicle generally employ a single gas generator in fluid communication with an uninflated air bag. A firing circuit typically triggers the gas generator when the sensed vehicle acceleration exceeds a predetermined threshold value, as through the use of an acceleration-responsive inertial switch. However, air bag inflation systems utilizing a single gas generator may be disadvantaged in that the onset pressurization/inflation rate is generally set to provide aggressive initial inflation in order to achieve a particular inflation time related to occupant position. An aggressive onset rate of pressurization may be problematic in situations where the occupant is out of position. Stated another way, rapid onset pressurization of the air bag may cause the air bag to impact against the occupant, thereby affecting the optimum kinematics of the occupant.

Consequently, multiple-chamber inflators have been developed which allow selective activation of either a single chamber or multiple chambers, depending on such factors as crash severity, occupant position sensing, and the weight and/or height of the occupant. Activation-of a single chamber provides softer deployment of the airbag, while simultaneous activation of multiple chambers provides the inflation force necessary to help prevent injury to heavier occupants of a vehicle. However, complete isolation of the propellant chambers of a multiple-chamber airbag inflator is critical to soft deployment of the airbag. It is also beneficial to facilitate an increase in pressure in an activated propellant chamber, because propellant residing in an enclosed chamber will burn more efficiently at higher chamber pressures.

SUMMARY OF THE INVENTION

The present invention relates to an improved structure for isolating the propellant chambers of a multiple-chamber inflator so as to insure proper airbag deployment, while enabling multiple chambers to be activated if so desired. A multiple-chamber inflator for a vehicle occupant protection system is provided. The inflator includes a housing having a first end, a second end, and a divider positioned in an interior of the housing intermediate the housing ends to form a primary propellant chamber and a secondary propellant chamber within the interior of the housing. The divider separates the primary and secondary chambers such that independent operation of each chamber may be assured. At least one aperture extends through the divider, enabling fluid communication between the primary and secondary chambers. A low-melting temperature, pressure-resistant shim is fixed to a surface of the divider over the aperture to block the aperture. The shim is configured to melt upon exposure to a predetermined temperature in the range of 175°–400° F. generated by combustion of a propellant in a propellant chamber in communication with the surface of the divider. The shim may be formed from a metal, an alloy, or a polymer. The shim isolates the primary chamber from the secondary chamber. The shim also facilitates an increase in pressure in the first chamber during combustion of the first gas generating propellant, thereby increasing the efficiency of the combustion reaction.

DETAILED DESCRIPTION

As stated above, the present invention includes a low-melting temperature shim positioned to cover an aperture in a divider which separates two propellant chambers in an inflator housing. U.S. Pat. No. 6,764,096 provides a detailed description of one example of an inflator in which the shim may be incorporated. The '096 patent issued on Jul. 20, 2004, and is incorporated herein by reference.

Figure 1:
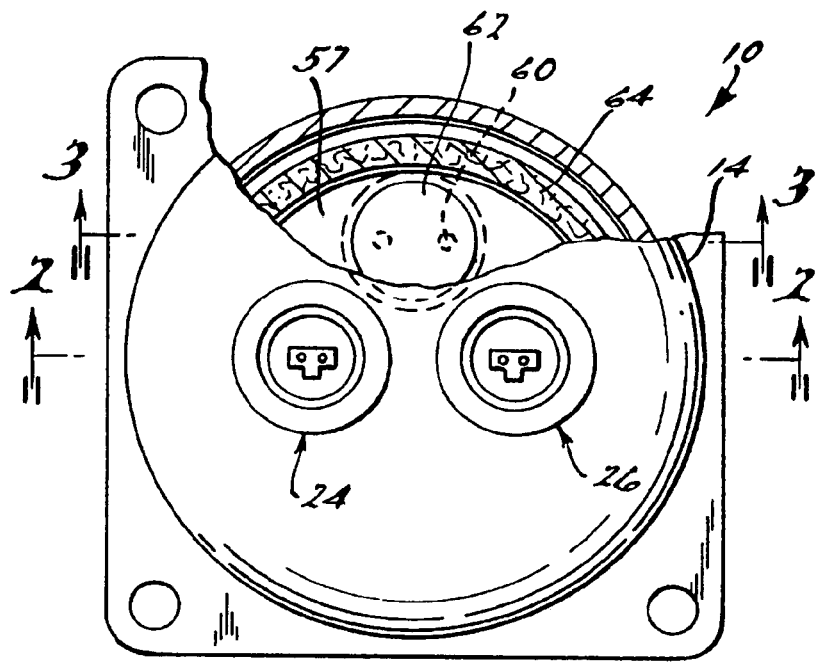
FIG. 1 is a partial cross-sectional top view of a multi-chamber inflator in accordance with the present invention.
Figure 2:
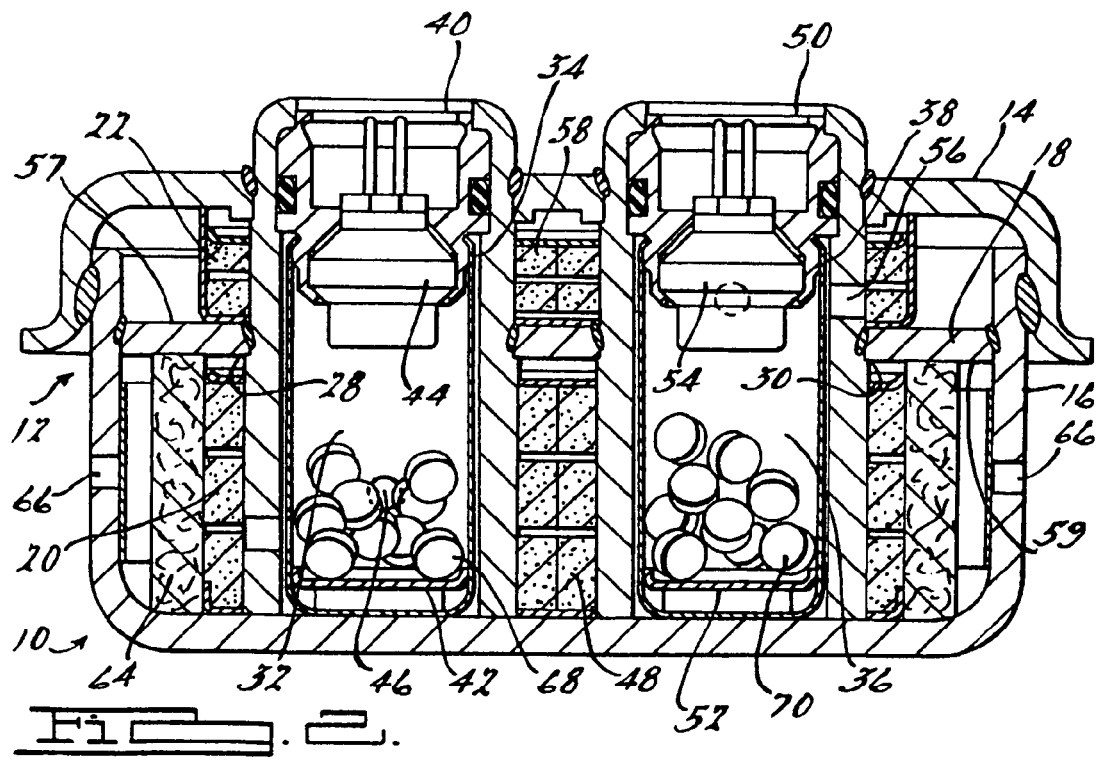
FIG. 2 is a cross-sectional view taken along the line 2—2 of FIG. 1.

As seen in FIGS. 1 and 2, an inflator 10, in accordance with one embodiment of the present invention, contains a housing 12 formed from a cap 16 welded or otherwise fixed to a base 14 to define opposite first and second ends of the housing. A divider disc 18 divides the housing 12 into a primary propellant chamber 20 and a secondary propellant chamber 22 in the interior of the housing. Chamber 20 is formed within base 16 and chamber 22 is formed within base 14.

Base 14, cap 16, and divider disc 18 are formed from stamped steel, or by using other known and accepted methods and materials. Base 14 contains a first annulus 24 and a second annulus 26. Divider disc 18 contains a third annulus 28 and a fourth annulus 30, each in corresponding axial alignment with first annulus 24 and second annulus 26, respectively.

As shown in FIGS. 1 and 2, a first igniter chamber 32 is formed when a first igniter tube 34 is inserted through and welded to the first and third annuli 24 and 28, respectively, wherein tube 34 and annuli 24 and 28 are substantially equal in circumference. Similarly, a second igniter chamber 36 is formed when a second igniter tube 38 is inserted through and welded to the second and fourth annuli 26 and 30, respectively, wherein tube 38 and annuli 26 and 30 are also substantially equal in circumference.

Chamber 32 contains a proximate end 40 and a distal end 42. A first igniter 44 is inserted through the proximate end 40 and is thereby disposed within ignition chamber 32. Igniter 44 is then crimped or otherwise secured to tube 34. At least one gas exit aperture 46 extends through distal end 42 thereby facilitating fluid communication between chamber 32 and a primary gas generant 48 within the primary propellant chamber 20.

Chamber 36 contains a proximate end 50 and a distal end 52. A second igniter 54 is inserted through the proximate end 50 and is thereby disposed within chamber 36. Igniter 54 is then crimped or otherwise secured to second tube 38. At least one second gas exit aperture 56 extends through proximate end 50 thereby facilitating fluid communication between ignition chamber 36 and a secondary primary gas generant propellant 58 within secondary propellant chamber 22.

An annular filter 64 is peripherally and radially spaced from an axis extending through chambers 20 and 22. A second plurality of gas exit apertures 66 are circumferentially and homolaterally disposed within the housing 12 and about the primary propellant chamber 20, thereby providing fluid communication between the chamber 20 and an airbag (not shown). In one embodiment, foil covers each aperture in the third plurality of apertures 66, thereby sealing chamber 20.

As shown in FIGS. 1 and 2, divider 18 is welded to tubes 34 and 38 and to cap 16. Tubes 34 and 38 are also welded to cap 16, thereby enhancing structural integrity of the inflator. As seen in FIG. 1, divider 18 also has a first surface 59 in communication with primary propellant chamber 20 and a second surface 57 in communication with secondary propellant chamber 22.

A first initiator composition 68 is provided within the first ignition chamber 32. A second initiator composition 70 is provided within the second chamber 36. Second initiator composition 70 may have the same composition or a different composition from first initiator 68.

In operation, a vehicle occupant protection system generates a signal indicating sudden deceleration or a crash event that is then sensed by igniter 44 thereby triggering ignition of the first initiator propellant 68. Upon ignition of composition 68, the heat, flame, and combustion gases produced flow into the primary gas generant chamber 20 thereby igniting primary gas generant 48. The resultant gases then flow from chamber 20 through filter 64 and out apertures 66 into an airbag (not shown).

Figure 3:
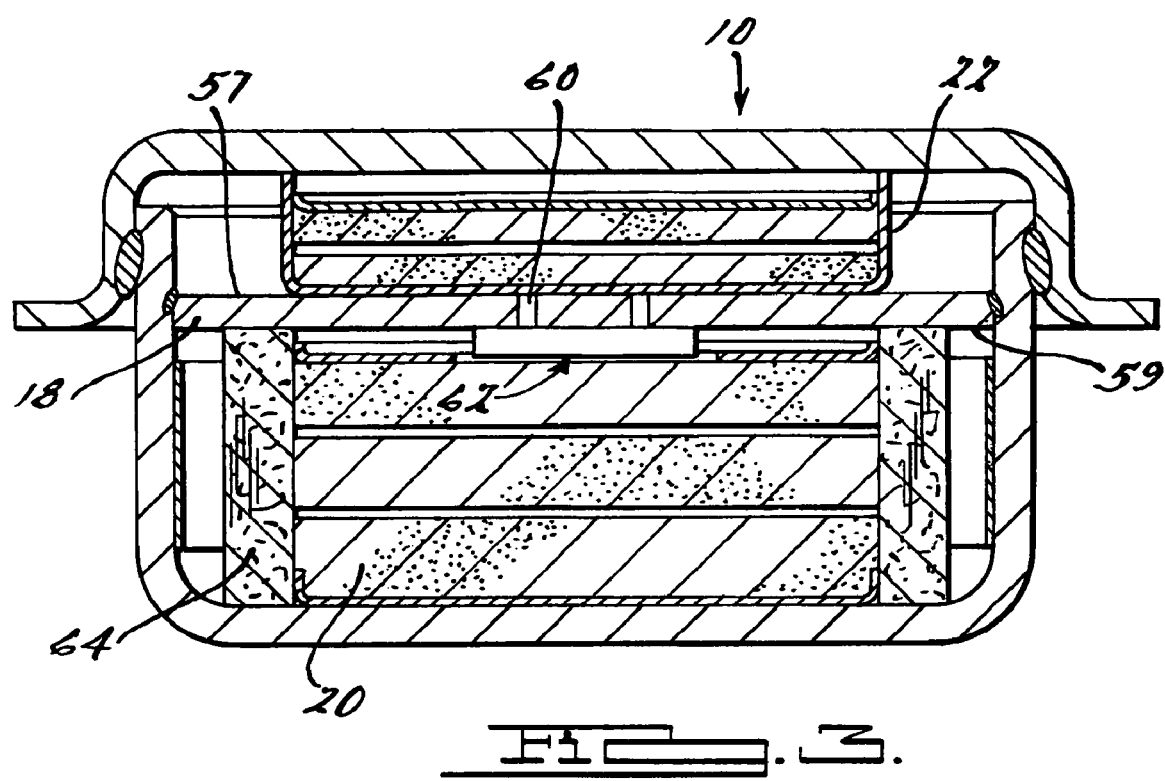
FIG. 3 is a cross-sectional view taken along the line 3—3 of FIG. 1.

Secondary chamber 22 is selectively operated based on factors such as crash severity, occupant position sensing, and the weight and/or height of the occupant. Divider disc 18 contains at least one aperture 60 for transfer of secondary gas from chamber 22 into chamber 20. In the embodiment shown in FIGS. 1–3, divider disc 18 includes a plurality of gas exit apertures 60. A low-melting temperature, pressure-resistant shim 62 covers the plurality of apertures 60 on surface 59 of disc 18, thereby isolating primary chamber 20 from chamber 22 and facilitating an increase in combustion pressure in primary chamber 20 when chamber 20 is activated. Shim 62 is configured to melt upon exposure to a predetermined temperature generated by combustion of propellant 48 in primary propellant chamber 20, thereby opening plurality of apertures 60.

Shim 62 is formed from a metal, metal alloy, polymer, or other substance that has a melting point in the range 175°–400° F. For example, shim 62 may be formed from a metal or metallic alloy containing a eutectic mixture of two or more elements selected from the group including tin, bismuth, lead, cadmium, indium, gold, silver, and copper. As shim 62 isolates primary chamber 20 from secondary chamber 22, shim 62 enables chamber 20 to be singularly operated without simultaneous operation of chamber 22 in the event air bag activation is required for a lower weight vehicle occupant.

Alternatively, given a heavier vehicle occupant, chambers 20 and 22 may be selected to simultaneously operate based on seat weight sensor and/or occupant position sensing algorithms known in the art. During simultaneous operation of the chambers 20 and 22, gas pressure produced from combustion of propellant 58 melts shim 62 and gas passes from chamber 20 through the aperture(s) 60, enabling gases produced in both chambers 20 and 22 to co-mingle as they exit the gas exit apertures 66.

The wire mesh filter 64 can be formed from multiple layers or wraps of metal screen, for example. Although not limited thereby, U.S. Pat. Nos. 6,032,979 and 5,727,813, herein incorporated by reference, illustrate typical metal filters.

The low-melting temperature, pressure-resistant shim described herein may be used in multiple-stage inflators that operate one or more chambers either simultaneously or in stepwise form. When the chambers containing the low melting point shims are activated, the remaining chambers are isolated and remain inactive by virtue of the shim. The shim melts as the combustion reaction propagates in the activated chamber thereby opening access to an adjoining chamber. Thus, the shim acts to suppress combustion of any inactive propellant beds in the adjoining chambers. Also, unlike conventional burst shims, the shim of the present invention is disabled in response to a predetermined temperature rather than by an increase in chamber pressure. Thus, the shim facilitates an increase in combustion pressure in the activated chamber, thereby increasing the efficiency of the combustion reaction in the activated chamber.

The above description illustrates the use of exemplary embodiments of the low-melting temperature, pressure-resistant shim in one particular multi-chamber inflator construction. However, use of the shim described herein is not limited to the particular inflator construction described above. Rather, the shim described herein may be used in any multi-chamber inflator incorporating propellant chambers separated by a perforated divider, where adjoining chambers are connected by a passage extending through the divider.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A multi-chamber inflator for a vehicle occupant protection system comprising:
a housing having a first end and a second end;
a divider positioned in an interior of the housing intermediate the housing ends to form a first propellant chamber and a second propellant chamber within the interior of the housing, said chambers operatively separated from each other, the divider having a first surface in communication with the first propellant chamber, a second surface in communication with the second propellant chamber, and at least one aperture extending between the first and second surfaces to provide fluid communication between the first propellant chamber and the second propellant chamber;
a first gas generating propellant contained within the first chamber for combustion upon activation of the inflator;
a second gas generating propellant contained within the second chamber for combustion upon activation of the inflator, the second propellant being optionally combustible simultaneously with the first propellant; and
a pressure-resistant shim fixed on the divider first surface over the at least one aperture to block the aperture to facilitate an increase in pressure in the first chamber during combustion of the first gas generating propellant, the shim being fabricated from a material which is meltable upon exposure to a predetermined temperature generated by combustion of the propellant in the first propellant chamber, thereby releasing the pressure in the first chamber subsequent to exposure of the shim to the predetermined temperature.

2. The inflator of claim 1 wherein the shim is formed from a low-melting temperature alloy comprising a eutectic mixture of two or more elements selected from the group consisting of tin, bismuth, lead, cadmium, indium, gold, silver, and copper.

3. The inflator of claim 1 wherein the shim is formed from a polymer.

4. The Inflator of claim 1 wherein the shim is formed from a material that has a melting point in the range 175°–400° F.

* * * * *